E. H. PORTER.
POTENTIAL REGULATOR.
APPLICATION FILED SEPT. 15, 1913.
1,165,372.
Patented Dec. 21, 1915.
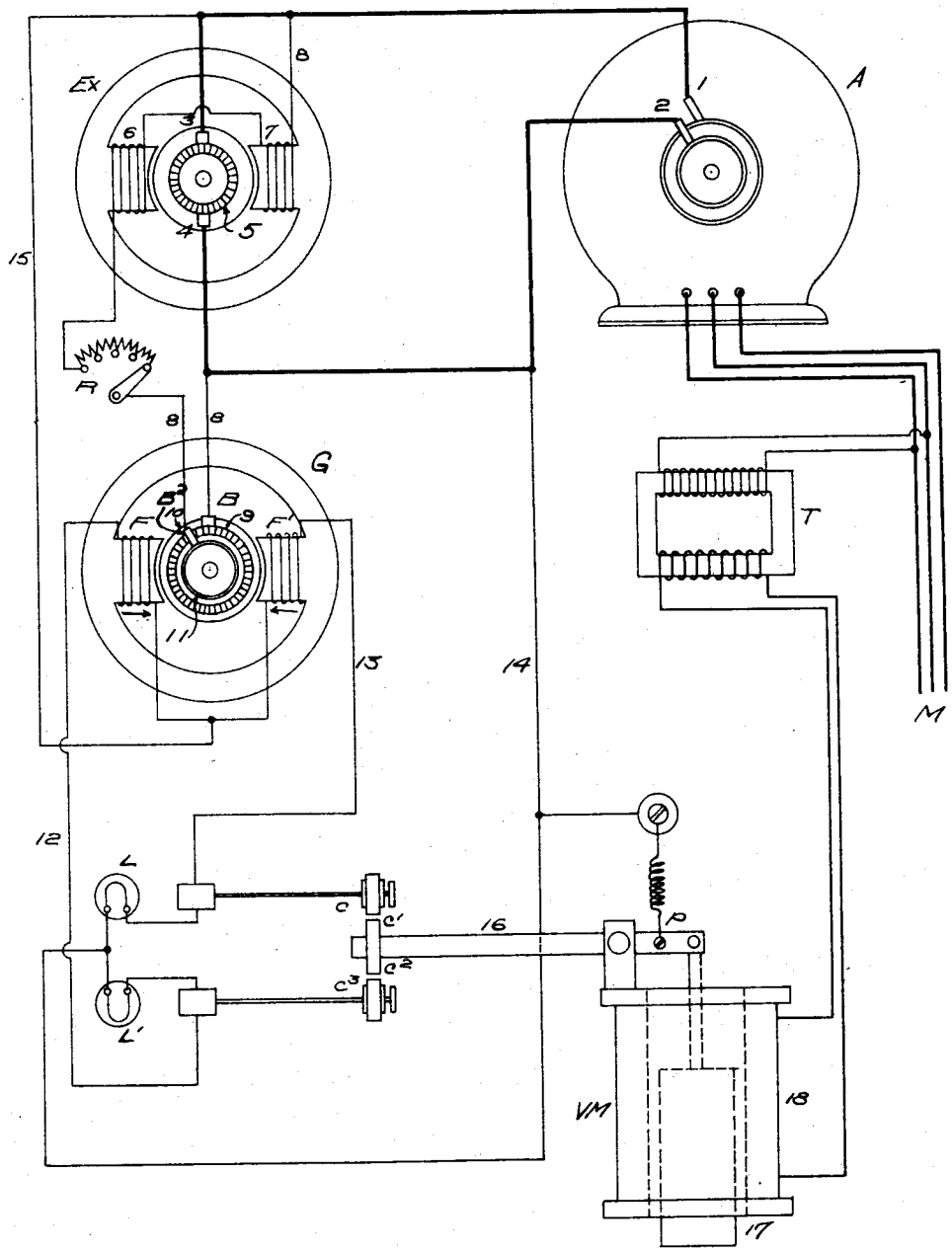

UNITED STATES PATENT OFFICE.

EDWIN H. PORTER, OF PHILADELPHIA, PENNSYLVANIA.

POTENTIAL-REGULATOR.

1,165,372.   Specification of Letters Patent.   Patented Dec. 21, 1915.

Application filed September 15, 1913. Serial No. 789,915.

*To all whom it may concern:*

Be it known that I, EDWIN H. PORTER, citizen of the United States, and resident of the city of Philadelphia, in the county of Philadelphia and State of Pennsylvania, have invented certain new and useful Improvements in Potential - Regulators, of which the following is a specification.

My invention relates to commercial electric generators and more especially those of the alternating current type and particularly to means for maintaining a fixed potential at the terminals of said generators, regardless of their inherent regulation.

The object of my invention is to provide an automatic regulator for dynamos especially those of the alternating current type, which will automatically maintain a constant potential at the terminals of the dynamo, or a potential of a pre-determined rise or fall regardless of the current, or load, or speed of same.

I have endeavored to construct a regulator simple in its action and at the same time of great reliability, accuracy and extreme range of action.

My invention contemplates using the standard alternators and exciters of modern practice and regulating the field strength of the exciter of the main dynamo by inserting a uni-directional electro-motive-force or current in series with its field circuit in such a manner as to either add to or depress the voltage and current already applied to the field circuit and therefore add to or depress at will, the voltage of the main generator to maintain it practically constant.

It is well known in the art that under a rapidly changing value of the voltage applied to the field circuit of a dynamo, the field current or magnetization of the field reaches and maintains a steady or average value and can therefore be controlled by controlling the rapidity and duration of these variations.

It has been the practice in various designs of regulators to obtain the desired variations of field exciting current by intermittently short circuiting the resistance or rheostat in the field circuit; controlling the duration of and the rapidity of this short circuiting of the rheostat or resistance by different arrangements of relays responsive to changes in voltage and arranged to vibrate contacts cutting the resistance in or out of the circuit intermittently to control the voltage of the generator. I have found that this method of varying the current impulses is of insufficient range and not quick or powerful enough in its action to meet all commercial conditions with absolute accuracy, especially in modern high speed generators where inherent regulation of twenty-five or even fifty per cent. is desirable, for other reasons in design.

Early types of regulators made only a gradual change of a few volts of the total applied to the field circuit, by cutting in or out a few sections of the rheostat or resistance in response to a voltage relay. Later types have somewhat increased the voltage applied to make a given change in field strength to about one-third the exciter voltage, by cutting in or out all or part of the field rheostat intermittently, thus reducing the time required to bring the voltage of the generator to normal; also reducing the tendency to over-reach.

My improvement consists in further increasing the applied voltage also reversing its polarity at will making the time required to make a given change much less, and the change more positive and accurate, by placing in series with the field circuit of the exciter dynamo the armature of a uni-directional pulsating, direct current generator and exciting the fields of this generator through a pair of field coils, the polarity of which is rapidly varied and reversed subject to the control of a simple potential relay or contacting voltmeter. This allows of inserting in series with the normal voltage applied to the exciter field circuit any desired impressed pulsating voltage, first in one direction, then neutralized, then reversed so as to force an instantaneous change in the field current and therefore in the strength of the field magnetization, by overpowering instantly any reluctance or counter electro-motive-force or inductance of the field circuit tending to oppose or delay the change.

I have found in practice that a pulsating E. M. F. of about the same value as that of the constant E. M. F. and applied in series to the field circuit, gives about the proper range for most conditions of modern service, to make instantaneous changes required in the field current to take care of the variable load conditions, the pulsating E. M. F. rapidly surging from zero to a desired maximum, thus removing all tendency to lag behind the load changes, or overreach or race, and allows using a simple potential relay or contacting voltmeter to control same.

Throughout the specification the words "electro-motive-force" are abbreviated to "E. M. F.," "direct current" to "D. C." and "alternating current" to "A. C."

The accompanying drawing is a diagrammatic sketch showing the arrangement of the parts as arranged for supplying an intermittent pulsating direct current in series to the exciter field circuit.

No mechanical driving arrangements are shown, as all or part of the machines can be belt driven or direct driven by motors or other suitable means.

In the drawing A represents an alternating current generator delivering current to the main circuit M.

EX is the exciter for magnetizing the fields of alternator A.

R is the rheostat for hand control of exciter EX.

The D. C. field circuit of the alternator A is supplied through the slip-rings and brushes 1 and 2 in the usual method from brushes 3 and 4 of the exciter EX on the commutator 5. The field coils 6 and 7 of exciter EX are supplied through the rheostat R with current from brushes 3 and 4 and commutator 5, the exciter field current passing through the brush B, commutator 9, the armature 10, the slip-ring 11 and the brush $B^2$ of the generator G. The field coils F and $F^1$ of generator G are opposed to each other in polarity and may be constructed as shown, or with each coil divided in two sections, the sections opposing. Coil F receives its magnetizing current through circuit 12 through contacts $C^2$—$C^3$, the circuit being completed through the pivot P, circuit 14 to brush 4, brush 3 and circuit 15. Coil $F^1$ receives its magnetizing current through circuit 13 contacts C—$C^1$ the circuit being completed through the pivot P, circuits 14 and 15 to brushes 3 and 4 of exciter EX. Contacts C—$C^1$ are bridged by lamp L and contacts $C^2$—$C^3$ by lamp $L^1$ the lamps acting as signals and preventing sparking of the contacts as well as maintaining both field coils partially excited at all times. The lever 16 carrying the contacts $C^1$—$C^2$ is mechanically connected at the other end to the core 17 operated by the solenoid 18, the whole composing the contacting voltmeter VM.

The coil 18 of the contacting voltmeter VM receives its magnetizing current from the main circuit M direct or through a transformer T. The magnetic pull on the core 17 varies with the potential applied to coil 18 and therefore the position of the core 17 balanced by gravity, varies in response to the variations in the potential of the main circuit M, and closes and opens contacts C—$C^1$ and contacts $C^2$—$C^3$ in response to such variations in potential. This closing of contacts C—$C^1$ or $C^2$—$C^3$ closes the one and opens the other field coil respectively, applying the full potential of the exciter EX, on field coils F or $F^1$ respectively, thus determining and controlling the polarity and resultant magnetization of field coils F and $F^1$ of generator G and therefore the polarity of the E. M. F. generated in the armature 10 of generator G and supplied in series with the field circuit 8 of exciter EX.

It is readily determined that as the potential of the circuit M applied to coil 18 raises or lowers the core 17 intermittently closing contacts C—$C^1$ and $C^2$—$C^3$, the field coils F and $F^1$ are alternately magnetized, producing corresponding changes in the polarity of the fields and therefore also of the armature 10 of the generator G in series with the field circuit of the exciter EX; that a pulsating E. M. F. is inserted in series with the field circuit of exciter EX, which is readily neutralized and reversed in polarity by closing and opening the contacts C—$C^1$ and $C^2$—$C^3$ as desired, thus adding to, or opposing the E. M. F. constantly applied to the exciter field circuit from brushes 3 and 4 the E. M. F. generated in armature 10 of the generator G. As the contacts C—$C^1$ also the contacts $C^2$—$C^3$ are very close together and the movement of the same is very sensitive to variations of potential applied to coil 18 of voltmeter VM, it is readily determined that the action of the same results in a series of pulsations of E. M. F. in the exciter field circuit adding to or opposing the voltage already acting in the field circuit, of such magnitude as instantly to change the field magnetization of the exciter EX and therefore the alternator A.

The operation of the regulator is as follows: The potential applied by circuit M to solenoid 18 of voltmeter VM is varying slightly at all times and the core 17 responds to these slight variations of E. M. F. by rising or lowering in position, inside solenoid 18. If the potential is slightly high the core rises, slightly lowering contact $C^2$ mounted on arm 16 and bringing it into contact with contact $C^3$ at the same time separating contacts C and $C^1$ thus magnetizing one and demagnetizing the other, of coils F and $F^1$ connected in such a manner as to generate an E. M. F. in armature 10 of generator G about equal to and opposed to the E. M. F. constantly applied to the field circuit 8 and field coils 6 and 7 of exciter EX, thus rapidly reducing the exciting current in the field circuit and therefore the voltage of exciter EX. This instantaneous reduction of the field current reduces the E. M. F. in alternator A and circuit M and in response solenoid 18 is weakened and instantly drops the core 17, closing contacts C—C¹, opening contacts C²—C³, instantly reversing the polarity of the field coils F and F¹ and armature 10 of generator G, and generating an E. M. F. in opposite direction, practically doubling the voltage applied to the field circuit of exciter EX, instantly increasing the field current and raising the voltage of the alternator A and main circuit M. If the voltage of the alternator A varies only slightly the contacts may vibrate so as to cause the cycle of operation as above to be only half applied and the voltage applied in series with the field circuit of the exciter to swing between either a positive or a negative value and zero without reversing. It is at the same time continually being rapidly brought back to zero by the pulsating nature of same.

The cycle of operation is repeated so rapidly that the variations of the voltage of the alternator A are negligible and therefore the voltage of the main circuit M is commercially constant.

The alternating current generator shown is acting only as a transformer of voltage and current and plainly can be omitted and the mains M connected directly to the brushes 3 and 4 of the generator EX. The alternating generator is shown as the more useful connection, but has no peculiar function, as the regulator is equally applicable to a direct current generator alone, or acting as an exciter to an alternating current generator.

Having thus described my invention, what I claim as new and desire to protect by Letters Patent of the United States is set forth in the following claims:

1. In a potential regulator, the combination of a direct current dynamo-electric machine having a direct current field circuit; and an armature supplying current to said field circuit; a source of uni-directional pulsating electro-motive-force in series with said field circuit; and means for rapidly neutralizing and reversing the polarity of the pulsating electro-motive-force.

2. In a potential regulator, the combination of a main generator; a direct current exciter dynamo-electric machine, having a direct current field circuit; and an armature therefor; a source of uni-directional pulsating current electro-motive-force in series with said field circuit; and means for rapidly neutralizing and reversing the polarity of said source of pulsating current in response to variations of potential of said main generator.

3. In a potential regulator, the combination of a main generator; a supply circuit connected thereto; a direct current exciter dynamo-electric machine, having a direct current field circuit; and an armature for exciting said field circuit; a source of pulsating uni-directional electro-motive-force in series with said field circuit; a voltage-responsive means for controlling the current generated by said source of uni-directional electro-motive-force in accordance with the electrical condition of said supply circuit.

4. In a potential regulator, the combination of a main generator; a supply circuit connected thereto; a direct current exciter dynamo-electric machine having a direct current field circuit; a uni-directional pulsating current generator having its armature in series with said field circuit and means for rapidly neutralizing and reversing the polarity of the electro-motive force generated in said armature in accordance with the electrical condition of said supply circuit.

5. In a potential regulator, the combination of a main generator; a supply circuit connected thereto; a direct current exciter dynamo-electric machine, having a direct current field circuit and an armature for said field circuit; a direct current generator having its armature in series with said field circuit, said armature equipped with a commutator and a slip-ring arranged to generate a uni-directional pulsating electro-motive-force and means for rapidly neutralizing and reversing the polarity of said electro-motive-force in response to variations of potential in said supply circuit.

6. In a potential regulator, the combination of a main generator; a direct current exciter dynamo-electric machine, having a direct current field circuit and an armature for said field circuit; a uni-directional pulsating current generator having its armature in series with said field circuit; field coils for said generator and means for rapidly neutralizing and reversing the polarity of the electro-motive-force generated in said armature by reversing the resultant polarity of the field coils of said pulsating current generator in response to variations of potential of said main generator, for the purpose as set forth.

7. In a potential regulator, the combination of an electric supply circuit; a direct current exciter therefor, having a direct current field circuit and an armature for exciting said field circuit; a pulsating-uni-directional current generator having its armature in series with said field circuit: field coils for said uni-directional pulsating current generator; a contacting voltmeter arranged to neutralize and reverse the polarity of said field coils and therefore the polarity of said armature, in response to variations of potential in said supply circuit.

8. In a potential regulator, the combination of a main generator; a direct current exciter dynamo-electric machine, having a direct current field circuit and an armature for exciting said field circuit; a uni-directional pulsating direct current generator, having its armature in series with said field circuit; field coils for said generator and a contacting voltmeter arranged to neutralize and reverse the resultant polarity of said field coils and therefore of the armature, of said pulsating direct current generator in response to variations of potential of said main generator.

9. In combination with a source of electric supply, means for controlling the voltage thereof, comprising a source of excitation therefor, and a source of pulsating electromotive-force independent of said supply and in circuit with said source of excitation.

10. In combination with a source of electric supply, means for controlling the voltage thereof, comprising a source of excitation therefor, a source of pulsating electro-motive-force independent of said supply and with said source of excitation, and means for controlling said pulsating source in accordance with the electrical condition of said electric supply.

11. In combination with a source of electric supply, means for controlling the voltage thereof; comprising an exciting winding, a pulsating generator independent of said supply and in circuit with said exciting winding, and means for controlling said pulsating generator in accordance with the electrical condition of said electric supply.

Signed at Philadelphia, in the county of Philadelphia and State of Pennsylvania, this 6th day of September, A. D. 1913.

EDWIN H. PORTER.

Witnesses:
EMMA D. CHAPPELL,
EDNA HICKS.

Copies of this patent may be obtained for five cents each, by addressing the "Commissioner of Patents, Washington, D. C."